United States Patent [19]

Levine

[11] 4,147,906
[45] Apr. 3, 1979

[54] ROTATION PADDLE BIN LEVEL INDICATOR

[75] Inventor: Walter E. Levine, Port Huron, Mich.

[73] Assignee: Bindicator Company, Port Huron, Mich.

[21] Appl. No.: 849,410

[22] Filed: Nov. 7, 1977

[51] Int. Cl.² .................................................. H01H 35/00
[52] U.S. Cl. ..................................... 200/61.2; 200/61.21
[58] Field of Search .......................... 200/61.12, 61.21; 340/246; 310/47

[56] References Cited

U.S. PATENT DOCUMENTS

| | | | |
|---|---|---|---|
| 2,851,553 | 9/1958 | Grastick | 340/246 X |
| 3,210,493 | 10/1965 | Lau | 200/61.2 |
| 3,210,495 | 10/1965 | Lau | 200/61.21 |
| 3,542,982 | 11/1970 | Gruber | 200/61.21 |
| 3,721,971 | 3/1973 | Gruber | 200/61.21 X |
| 3,818,159 | 6/1974 | Evans et al. | 200/61.21 |
| 3,941,956 | 3/1976 | Delin et al. | 200/61.2 |
| 4,095,064 | 6/1978 | Fleckenstein | 200/61.21 |

Primary Examiner—James R. Scott
Attorney, Agent, or Firm—Barnes, Kisselle, Raisch & Choate

[57] ABSTRACT

Apparatus for indicating the level of flowable material in a storage bin comprising a motor rotatably suspended by a spring within a protective enclosure and a drive shaft coupled by a ball-and-detent clutch to a paddle disposed within the bin to engage material therein. When the material reaches the level of the paddle, the drag on the paddle causes the motor to rotate eccentrically within the enclosure and thereby to activate switches disposed within the enclosure radially of the motor housing. A spring returns the motor to the switch-deactivated position when the material level decreases and the consequent drag is removed from the paddle.

7 Claims, 8 Drawing Figures

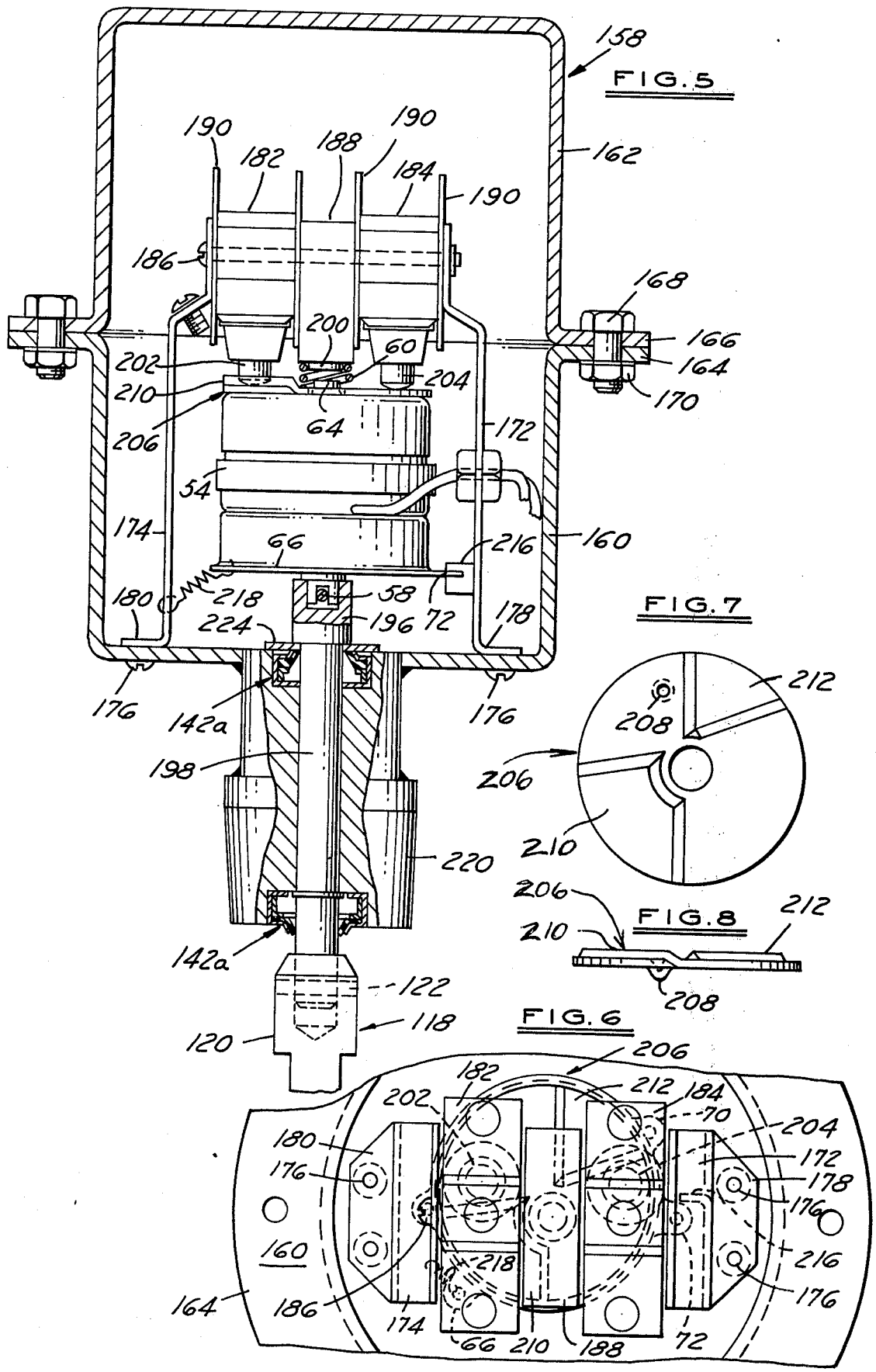

ROTATION PADDLE BIN LEVEL INDICATOR

BACKGROUND OF THE INVENTION

The present invention relates to bin level indicators, and more particularly to an improved apparatus of the rotating paddle type for indicating the level of flowable material in a storage tank or bin.

Bin level indicators of the above-noted type typically comprise a motor carried for limited rotation within a protective enclosure and connected to a rotatable paddle which is adapted to engage flowable material within a storage bin when the material rises to the bin level at which the rotating paddle is disposed. The material drag on the paddle causes the motor drive torque to rotate the motor rather than the paddle, which rotation is normally sensed by one or more switches carried within the enclosure. The switches may be connected to deactivate a conveyor feeding material to the bin, to remove power from the indicator motor and/or to perform other control functions related to material level. Two examples of bin level indicators of the described type are shown in the U.S. patents of Grostick Nos. 2,851,553 and Gruber 3,542,982.

SUMMARY OF THE INVENTION

It is an object of the present invention to provide an improved rotating paddle bin level indicator which is more economical to fabricate and assemble than are prior art indicators of similar type. In furtherance of the object stated immediately above, it is another object of the invention to provide an improved rotating paddle bin level indicator which has a reduced number of component parts and in which component parts may be either purchased as standard off-the-shelf elements or may be fabricated at minimum expense.

Another object of the present invention is to provide a rotating paddle bin level indicator in which the indicator motor is suspended within the housing in a manner substantially to isolate the motor from damage which may be caused by externally-induced vibrations such as caused by rocks or material chunks striking the bin wall adjacent the mounted position of the indicator.

BRIEF DESCRIPTION OF THE DRAWINGS

The invention, together with additional objects, features and advantages thereof, will be best understood from the following description, the appended claims and the accompanying drawings in which:

FIG. 5 is a partially sectioned side view of an alternative embodiment of the indicator provided by the present invention;

FIG. 6 is a broken plan view of the indicator illustrated in FIG. 5 with the cover removed; and FIGS. 7 and 8 are respective plan and elevational views of the switch actuator plate used in the indicator of FIGS. 5 and 6.

DETAILED DESCRIPTION OF THE PREFERRED EMBODIMENTS

Figure 1:
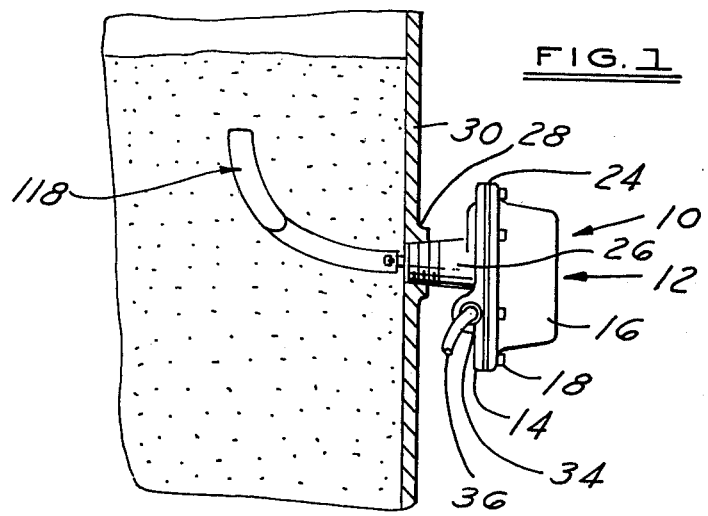
FIG. 1 is an elevational view, partly in section, showing a presently preferred embodiment of the bin level indicator provided by the invention.
Figure 2:
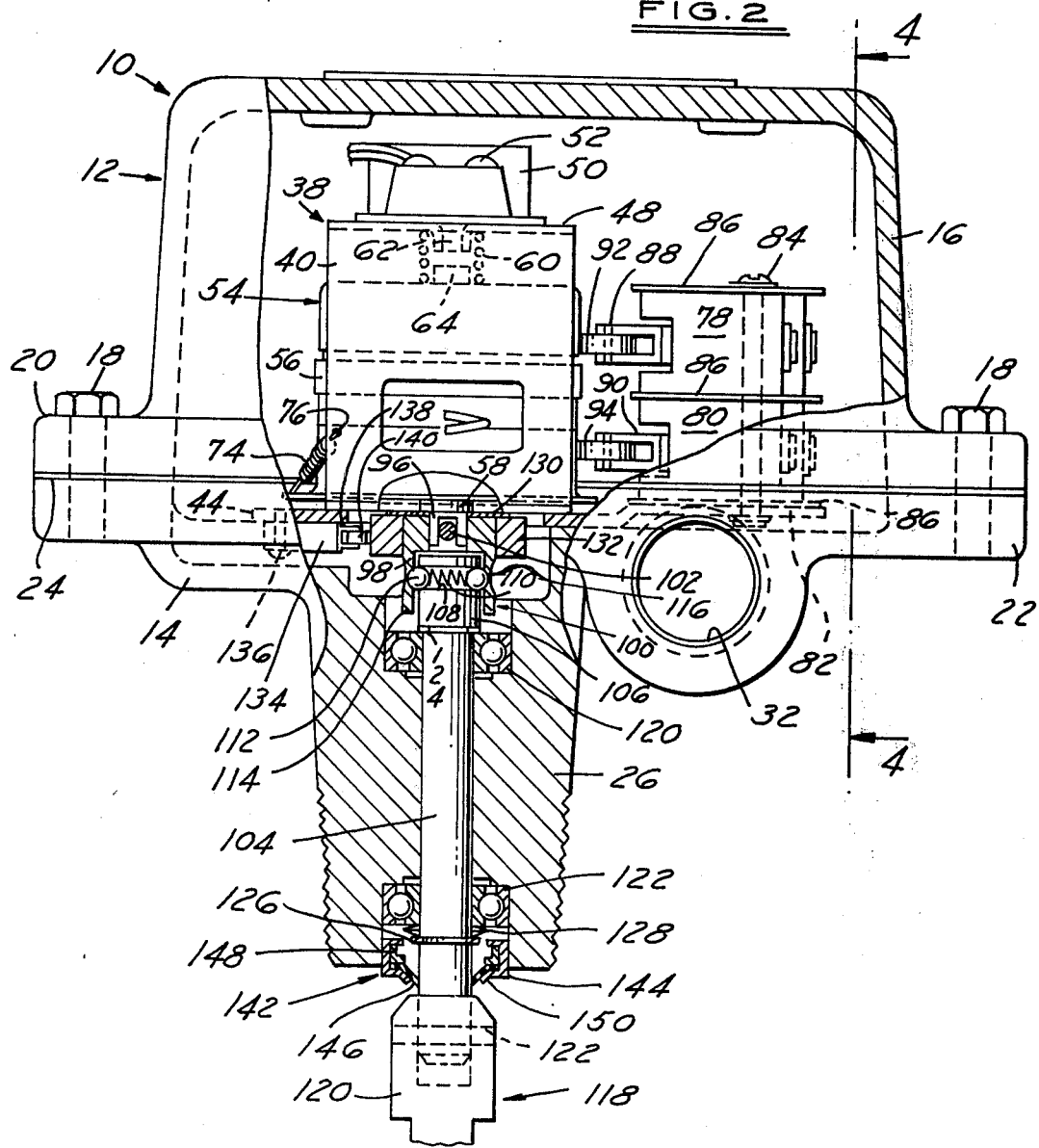
FIG. 2 is a partial sectional side view of the indicator shown in FIG. 1 substantially taken along the line 2—2 in FIG. 4.
Figures 3, 4:
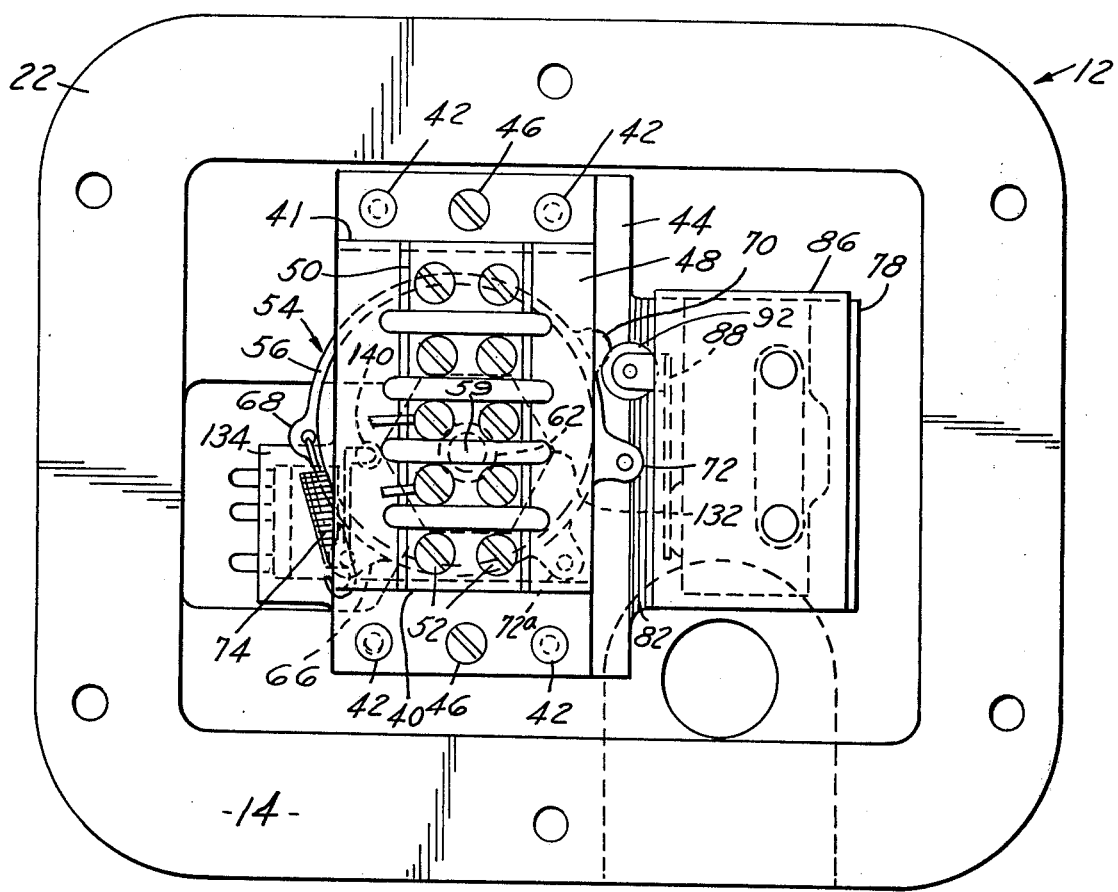
FIG. 3 is a plan view of the indicator shown in FIGS. 1 and 2 with the cover removed.
FIG. 4 is a partially sectioned side view generally taken along the line 4—4 in FIG. 2.

Referring to FIGS. 1-4, a presently preferred embodiment 10 of the bin level indicator provided by the present invention includes a protective housing or enclosure 12 comprising a shallow cup-shaped enclosure base 14 and a deeper cup-shaped enclosure top or cover 16. Cover 16 is mounted to base 14 by bolts 18 extending through apertures in a radially extending flange 20 on cover 16 into threaded apertures in a corresponding base flange 22 with a sealing gasket 24 being disposed between the respective flanges. A hollow externally threaded nipple 26 extends outwardly from base 14 and is adapted to be threadably received in a corresponding internally threaded gland 28 (FIG. 1) carried by the wall of a material storage tank or bin 30. An internally threaded laterally opening hole 32 is formed adjacent base flange 22 to receive a strain relief grommet or the like 34 (FIG. 1) through which is fed a multiple-conductor electrical cable 36 adapted for connection to level indicating apparatus (not shown) disposed externally of enclosure 12. Internally, indicator 10 includes an open generally cup-shaped bracket 38 having the outwardly flanged side portions 40,41 mounted as by rivets 42 (FIG. 3) to a switch plate 44 which, in turn, is fixedly connected to enclosure base 14 by screws 46. A bridging bracket portion 48 connects bracket side portions 40,41 and a terminal block 50 or the like is mounted by screws 52 on bridging portion 48 for electrical interconnection of the internal indicator components to external mounting and control circuitry (not shown) by means of cable 36 (FIG. 1).

A motor 54 is carried within enclosure 12 and comprises a generally cylindrical motor housing 56 having a rotatable shaft 58 (FIG. 2) extending axially from one end thereof eccentrically of housing 56. A coiled spring 60 is disposed between motor housing 56 and bracket bridge portion 48 positioned thereabove, and is held in axial alignment with shaft 58 by a boss or eye 62 extending downwardly from bracket portion 48 into the spring coils, and by an opposing boss 64 extending upwardly from the motor housing. The motor 54 show in the drawings is purchased from Hansen Manufacturing Company, of Princeton, Ind. under part No. 34668RK247RL and includes four apertured ears 66-72 extending radially outwardly from a portion of the housing 56 adjacent shaft 58. A coiled spring 74 extends between an aperture 76 in bracket side wall 40 and an aperture in housing ear 68 to bias motor housing to a normal or rest position best seen in FIG. 3 wherein ear 66 abuts bracket wall 40 and the eccentricity of the motor housing with respect to the axis of shaft 58 extends away from wall 40.

A single or a pair of mechanically-actuated switches 78,80 are mounted by the screws 84 on a ledge 82 of bracket 44 in side-by-side stacked relation with suitable insulators 86 being disposed therebetween. Switches 78,80 include respective switch actuator arms 88,90 which extend from the switch bodies and terminate in roller elements 92,94 which engage the side wall of motor housing 56. Motor shaft 58 normally rotates in the counterclockwise direction as viewed in FIG. 3. However, when the shaft is held against rotation by material engaging paddle 118 (FIG. 1), motor housing 56 rotates eccentrically in the clockwise direction as viewed in FIG. 3 to actuate switches 78,80, such rotation being limited by eventual abutment of motor housing ear 72 with an opposing edge of bracket sidewall 40 as shown in phantom at 72a in FIG. 3. Spring 74 will return motor housing 56 to the normal or rest position upon removal of material drag from the motor shaft as hereinabove described, thereby causing deactivation of switches 78,80.

A forked end 96 of drive shaft 58 is received in the collar element 98 of a ball-and-detent clutch assembly 100 (FIG. 2) and is rotatably coupled thereto by means of a pin 102 extending through forked end 96 across collar 98. A paddle drive shaft 104 terminates internally of enclosure 12 in a hub 106 having a cylindrical bore 108 extending diametrically therethrough. A coil spring 110 and a pair of balls 112 are disposed in hub hole 108 with the balls 112 protruding radially from opposite ends of the hole in the rest condition of spring 110. Clutch collar 98 has an axially extending flange 114 which surrounds hub 106. A pair of holes 116 are formed radially in the flange opposite remote ends of holes 108 to receive the protruding portions of the respective balls 112. As clutch collar 98 is axially assembled over drive shaft hub 106, spring 110 and balls 112 are forced radially inwardly such that the spring is in compression and holds the balls in yieldable engagement with the corresponding flange holes 116.

During normal operation, balls 112 remain engaged with the corresponding holes 116 in clutch collar 98 and the rotary motion of motor shaft 58 is transmitted through the clutch assembly 100 to drive shaft 104. Should rotation of drive shaft 104 be impeded by impact of material in contact with paddle 118 (FIGS. 1 and 2) directly coupled thereto, and when motor housing 54 has reached its above-noted limit of reactive counterrotation, the tendency of motor shaft 58 and clutch collar 98 to continue rotating relative to shaft hub 106 forces balls 112 to roll over the edges of holes 116 in clutch collar flange 114 so as to be driven radially inwardly against the force of spring 110 to a retracted position in hub bore 108. Thus, excessive torque on motor shaft 58 causes the balls and the flange holes to become disengaged, whereby motor shaft 58 is free to rotate. Clutch 100 thereby disengages the paddle and drive shaft from the motor in the event of shock loading of the paddle by impact of material thereon. This safety arrangement prevents damage to the motor internal gear train. After 180° of motor shaft rotation, the balls 112 again register with the apertures 116 in clutch collar 98. The balls will again disengage from the clutch collar if rotation of drive shaft 104 is still impeded, such repetitive engagement and disengagement continuing until the resistance to rotation of the drive shaft and the clutch collar drops below a value corresponding to the torque transmission limit of clutch assembly 100.

Drive shaft 104 extends through the roller bearings 120,122 which are press-fitted into corresponding recesses in enclosure mounting nipple 26, and is axially positioned therein by the retaining rings 124,126 received in corresponding grooves in the drive shaft on respectively opposite sides of bearings 120,122. An annular leaf spring or belleville washer 128 is captured between retaining ring 126 and bearing 122 to absorb axial shock on the drive shaft caused by rocks or the like striking paddle 118. Thus, drive shaft 104 is held in fixed axial position with respect to apparatus enclosure 12, and motor 54 effectively floats within the enclosure. More specifically, motor housing 56 is biased by spring 60 into face-to-face axial engagement with clutch collar 98 with a thrust washer bearing 130 being disposed therebetween. Thus, motor 54 is effectively vibrationally isolated from housing 12 and is free to float relative thereto by the relatively loose fit of shaft forked end 98 over pin 102 and by the shock-absorbing spring 60. A multi-lobed cam 132 is press-fitted at the subassembly stage over clutch collar 98 after pin 102 has been inserted therein. A switch 134 is mounted on switch plate 44 by a screw 136 and has an actuator arm 138 terminating in a roller 140 in engagement with the radial surface of cam 132 to send pulsed signals to level sensing circuitry (not shown) to indicate continued operation of motor 54.

A sealing assembly 142 is pressed-fitted into the housing-remote end of gland 26 and comprises a collar 144 having a radially inwardly directed channel which receives a resilient lip-sealing element 146 and an annular spacer element 148 which firmly pinches an end of sealing element 146 within the collar. Collar 44 has a lip 150 extending angularly and axially therefrom to support the sealing edge of element 146 in sealing engagement with drive shaft 104. Paddle 118 shown in FIG. 1 terminates in a collar 120 (FIG. 2) which is rotatably coupled by a pin 122 to an end of drive shaft 104 received telescopically therein. Paddle 118 is shown and described in greater detail in the co-pending application of Phillip P. Fleckenstein Ser. No. 727,273, filed Sept. 27, 1976 and assigned to the assignee hereof, now U.S. Pat. No. 4,095,064 the disclosure of such application being incorporated herein by reference.

An alternative embodiment 158 of the indicator provided by the present invention is illustrated in FIGS. 5–8 and comprises a cup-shaped enclosure base 160 and a top 162 having respective radially outwardly extending flanges 164,166 at their open ends connected to each other by bolts 168 passing therethrough and threadable receiving suitable nuts 170. In the embodiment of FIGS. 5–8, the motor-bridging means includes the side bracket elements 172,174 mounted on housing base 160 by screws 176 passing therethrough into corresponding bracket flanges 178,180. A pair of switches 182,184 are mounted in side-by-side relation between side bracket 172,174 by a screw 186, a spacer element 188 being captured between switches 182,184 and suitable insulator elements 190 bracketing the respective switches. Motor 54 is suspended within the enclosure by having a motor shaft 58 loosely received in and pinned to a hub 196 of a paddle drive shaft 198. The compression spring 60 is disposed between motor 54 and spacer 188, and is centered with respect thereto by the respective bosses 200,64 on spacer 188 and motor 54.

Switches 182,184 have respective actuators 202,204 with rounded ends extending downwardly therefrom into engagement with a cam switch plate 206 mounted on a shaft-remote end of motor 192 and angularly located thereon by means of a dimple 208 (FIGS. 7 and 8) being received in a corresponding locating aperture (not shown) in the motor housing. Raised plate portions 210,212 are stamped into plate 206 and are normally angularly spaced from switch actuators 202,204 in the rest position of motor 54 as best seen in FIG. 6, and engage the respective switch actuators upon rotation of the motor housing in response to engagement of material with paddle 118. A return spring 218 extends between apertured motor ear 66 and bracket 174. The respective rest and rotation-limit positions of motor 54 are defined by abutment of motor ears 72 and 70 (FIG. 6) with a tab 216 struck inwardly from side bracket 172. Drive shaft 198 extends through lip seals 142a,142b pressed-fitted into enclosure gland 220 and directly couples motor shaft 58 to paddle 118. Seals 142a and 142b are respectively identical to lip seal 142 discussed in connection with FIG. 2. Drive shaft 198 is located axially with respect to apparatus mounting nipple 220 by means of a retaining ring 222 which encompasses the draft shaft adjacent lip seal 142a and spaces shaft hub 196 from enclosure base 160. The remain structural and operational details of the embodiment of FIGS. 5-8 will be self-evident for the foregoing description of the preferred embodiment of FIGS. 1-4.

The invention claimed is:

1. In an apparatus for indicating the level of material in a storage bin comprising a hollow enclosure including means extending from said enclosure adapted to engage a gland carried by a bin wall for mounting said apparatus to a bin, a motor mounted for limited rotation within said enclosure and having a motor housing and a drive shaft, a paddle adapted to be disposed for rotation within said bin, rotation of said paddle being retarded when material stored in said bin reaches the level of said paddle, means extending through said gland-engaging means driveably coupling said paddle to said motor drive shaft for rotating said paddle, and means mounted within said enclosure for detecting limited rotation of said motor when rotation of said paddle is retarded by material stored within said bin, the improvement wherein said motor is suspended within said enclosure by first means coupled to said shaft for preventing radial movement of said shaft and motor housing relative to said enclosure and spring means suspending relative to said enclosure an end of said motor housing remote from said shaft, said motor housing axially floating within said enclosure between said first means and said spring means.

2. The apparatus set forth in claim 1 wherein said spring means comprises a coil spring having an axis aligned with the axis of said motor shaft, said coil spring biasing said motor housing against said first means.

3. The apparatus set forth in claim 2 further comprising thrust washer bearing means surrounding said shaft in opposed facing engagement with said housing and said first means to facilitate limited rotation of said housing with respect to said first means when rotation of said paddle is retarded.

4. The apparatus set forth in claim 3 further comprising bracket means including a first portion rigidly coupled to said enclosure and a second portion bridging said motor at an end thereof remote from said shaft, said coil spring extending between said motor housing and said second portion for axially suspending said motor housing within said enclosure.

5. The apparatus set forth in claim 4 wherein said motor housing includes at least a portion carried eccentrically of said drive shaft, and wherein said detecting means comprises switch means mounted radially of said motor housing and responsive to limited rotation of said eccentric portion of said housing with respect to said enclosure to activate said switch means.

6. The apparatus set forth in claim 4 wherein said detecting means comprises a plate carried at an axial end of said motor housing remote from said shaft and having an axially-directed cam surface and switch means mounted on said second portion of said bracket means having switch actuator means extending into axial engagement with said cam surface, limited co-rotation of said motor housing and said plate means bringing said cam surface into engagement with said actuator means.

7. The apparatus set forth in claim 4 wherein said means driveably coupling said paddle to said motor drive shaft comprises a ball-and-detent clutch.

* * * * *